United States Patent [19]

Holmgren

[11] Patent Number: 5,296,427
[45] Date of Patent: Mar. 22, 1994

[54] FLUORIDED BEIDELLITE CLAY AND PROCESS FOR PREPARING THE CLAY

[75] Inventor: Jennifer S. Holmgren, Bloomingdale, Ill.

[73] Assignee: UOP, Des Plaines, Ill.

[21] Appl. No.: 973,456

[22] Filed: Nov. 9, 1992

[51] Int. Cl.$^5$ .......................... B01J 20/10; B01J 21/16
[52] U.S. Cl. ......................................... 502/63; 502/73; 502/80; 502/84
[58] Field of Search .................... 502/63, 80, 84, 73

[56] References Cited

U.S. PATENT DOCUMENTS

| | | | |
|---|---|---|---|
| 3,855,147 | 12/1974 | Granquist | 252/317 |
| 5,089,458 | 2/1992 | Breukelaar et al. | 502/63 |
| 5,192,725 | 3/1993 | Holmgren | 502/61 |
| 5,192,726 | 3/1993 | Holmgren | 502/62 |

FOREIGN PATENT DOCUMENTS

0317006A2 5/1989 European Pat. Off.

Primary Examiner—Carl F. Dees
Attorney, Agent, or Firm—Thomas K. McBride; Eugene I. Snyder; Frank S. Molinaro

[57] ABSTRACT

This invention relates to a novel beidellite clay, a process for preparing the clay and processes using the clay. The clay has the empirical formula $$A_x(Al_4)(Si_{8-x}Al_x)(O_{20})(OH_{4-u}F_u)$$

where A is a cation, x is the moles of A and varies from about 0.1 to about 2, and u varies from about 0.1 to about 3.5. The clay is prepared from a reaction mixture containing reactive sources of aluminum and silicon, a cation salt, a fluoride source and water. The mixture is reacted at a pH of about 4 to about 9, a temperature of about 150° to about 300° C. for a time of about 1 to about 20 days. The clay composition may be used as is or after pillaring to catalyze hydrocarbon conversion processes such as alkylation.

13 Claims, No Drawings

FLUORIDED BEIDELLITE CLAY AND PROCESS FOR PREPARING THE CLAY

FIELD OF THE INVENTION

This invention relates to a novel fluorided beidellite clay composition, a process for preparing the clay and processes using the clay. The clay is prepared at a pH of 4-9 from a reaction mixture containing reactive sources of aluminum and silicon, a cation, a fluoride source and water.

BACKGROUND OF THE INVENTION

Naturally occurring clays such as dioctahedral smectites are composed of semicrystalline aluminosilicate layers (lamellae) held together by Van der Waals and electrostatic forces. Anionic charges on the siliceous layers are neutralized by cations in the interlamellar spaces. These cations are usually sodium, calcium, or potassium. When these cations are large oligomers of inorganic cations such as $Fe^{+3}$, $Cr^{+3}$ or when they are metal hydroxy polymer cations such as $(Al_{13}O_4(OH)_{24}(H_2O)_{12})^{7+}$ or $(Zr(OH)_2\cdot4H_2O)_4^{8+}$, they act as pillars, propping the clay layers apart to afford a pillared layered clay. Upon heating, these oligomers or polymers are converted to the metal oxide, thus preventing the collapse of the clay layers and thus pillaring the clay.

Smectite clays are a family of clays which include as its members montmorillonite, beidellite, nontronite, saponite, hectorite and sauconite. Of these materials beidellite, hectorite and saponite have been prepared synthetically. Saponite contains magnesium, aluminum and silicon and is represented by the formula

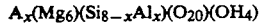
$$A_x(Mg_6)(Si_{8-x}Al_x)(O_{20})(OH_4)$$

where A is a cation such as an alkali metal cation. In contrast, beidellite contains only silicon and aluminum and has the formula

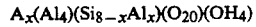
$$A_x(Al_4)(Si_{8-x}Al_x)(O_{20})(OH_4)$$

There are also reports that saponite can be prepared by substituting fluoride ions for the hydroxyl ions. Thus, U.S. Pat. No. 3,855,147 discloses a process for preparing a saponite material where a fraction of the hydroxyl groups are replaced by fluorides. Similarly U.S. Pat. No. 5,089,458 discloses a saponite derivative in which some of the magnesium has been replaced by a divalent metal ion and some of the hydroxyl groups have been replaced by fluorides. Finally, European Patent Publication 317,006A2 discloses the preparation of a saponite in which fluorides are used instead of hydroxyl.

In contrast to the above, applicant has prepared a fluorided beidellite. Applicant's process reacts a mixture containing reactive sources of aluminum, silicon, a cation salt and a fluoride source. This process differs from those disclosed in the art in that it is carried out at a pH of about 4 to about 9, at a low temperature and uses a fluoride source. Thus, applicant is the first to synthesize a fluorided beidellite clay.

SUMMARY OF THE INVENTION

This invention relates to a clay composition, a process for preparing the composition and a method of using the composition. Accordingly, one embodiment of the invention is a beidellite layered clay composition having the empirical formula

$$A_x(Al_4)(Si_{8-x}Al_x)(O_{20})(OH_{4-u}F_u)$$

where A is a cation, x is the moles of the cation and varies from about 0.1 to about 2.0 and u varies from about 0.1 to about 3.5.

Another embodiment of the invention is a process for preparing a beidellite layered clay composition having the empirical formula

$$A_x(Al_4)(Si_{8-x}Al_x)(O_{20})(OH_{4-u}F_u)$$

where A is a cation, x is the moles of the cation and varies from about 0.1 to about 2.0, and u varies from about 0.1 to about 3.5, the process comprising providing a reaction mixture at a pH of 4 to 9, at an effective temperature and for an effective time to produce the composition, the reaction mixture comprised of reactive sources of aluminum and silicon, a cation salt, a fluoride source and water, the reaction mixture expressed in terms of molar ratios by the formula

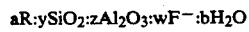
$$aR:ySiO_2:zAl_2O_3:wF^-:bH_2O$$

where R is at least one cation salt, a is the moles of R and is chosen such that the ratio of a:y varies from about 1 to about 20, y is the moles of $SiO_2$ and varies from about 6.6 to about 7.8, z is the moles of $Al_2O_3$ and varies from about 2.1 to about 2.7, w is the moles of fluoride and is chosen such that the ratio of Si:F is greater than 0.4 to about 6.0, and b is the moles of water and varies from about 40 to about 500.

Yet another embodiment of the invention is a hydrocarbon conversion process comprising contacting a hydrocarbon feed under hydrocarbon conversion conditions with a catalyst to give a hydroconverted product, the catalyst comprising a beidellite layered clay composition having the empirical formula

$$A_x(Al_4)(Si_{8-x}Al_x)(O_{20})(OH_{4-u}F_u)$$

where A is a cation, x is the moles of the cation and varies from about 0.1 to about 2.0, and u varies from about 0.1 to about 3.5.

Other objects and embodiments will become more apparent after a more detailed description of the invention.

DETAILED DESCRIPTION OF THE INVENTION

As stated, this invention relates to a clay composition, a method of preparing the clay composition and processes using the composition. The clay of the present invention is a beidellite clay which has the empirical formula

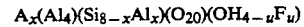
$$A_x(Al_4)(Si_{8-x}Al_x)(O_{20})(OH_{4-u}F_u)$$

where A is a cation selected from the group consisting of alkali metals, quaternary ammonium ions, quaternary phosphonium ions and mixtures thereof, x is the moles of A and varies from about 0.1 to about 2.0, and u varies from about 0.1 to about 3.5 and preferably from about 1.0 to about 3.0. Other characteristics of the beidellite composition of this invention will be described hereinafter.

The composition of the instant invention is prepared from a reaction mixture which contains reactive sources of aluminum and silicon, a salt of the cation, a fluoride source and water. The reaction mixture is expressed in terms of molar ratios by the formula $aR:ySiO_2:zAl_2O_3:wF^-:bH_2O$ where R is at least one cation salt, a is the moles of R and is chosen such that the ratio of a:y varies from about 1 to about 20, and preferably from about 5 to 10, y is the moles of $SiO_2$ and varies from about 6.6 to about 7.8, z is the moles of $Al_2O_3$ and varies from about 2.1 to about 2.7, w is the moles of fluoride and is chosen such that the ratio of Si:F is greater than 0.4 to about 6 and preferably greater than 0.8 to about 3, and b is the moles of water and varies from about 40 to about 500.

The cation salts which can be used in preparing the clay composition of this invention are alkali metal compounds, quaternary ammonium or quaternary phosphonium compounds, the latter two compounds having the formula $R'_4M^+X^-$ where R' is an alkyl group containing from 1 to 8 carbon atoms or an aryl group, M is nitrogen or phosphorus and X is carbonate, hydroxyl or halide. Illustrative of the alkali metal compounds are the chloride, fluoride, hydroxide and carbonate salts of sodium, potassium and lithium. Illustrative of the quaternary compounds which can be used are the hydroxide, carbonate, chloride, bromide, fluoride and iodide salts of the following cations: tetramethylammonium; tetraethylammonium; tetrapropylammonium; tetrabutylammonium; tetra-t-butylammonium; tetrapentylammonium; tetraphenylammonium; tetramethylphosphonium; tetraethylphosphonium; tetrapropylphosphonium and tetraphenylphosphonium. It should be pointed out that mixtures of cation salts can also be used to prepare compositions of this invention. The amount of cation salt that is necessary is determined by the amount of silicon present in the mixture. It is necessary that the ratio of the moles of cation salt to the moles of silicon in the mixture vary from about 1 to about 20 and preferably from about 5 to about 10.

Another necessary component of the reaction mixture is a reactive source of aluminum. By reactive is meant a compound that is not fully condensed. That is the compound still contains one or more hydroxide groups or is hydrated. Illustrative examples of reactive sources of aluminum include sodium aluminate, boehmite alumina, gibbsite alumina, aluminum hydroxide, aluminum alkoxides and mixtures thereof. If aluminum hydroxide is used it is preferred to use freshly prepared aluminum hydroxide. Specific examples of aluminum alkoxides include aluminum isopropoxide and aluminum t-butoxide. A further necessary component of the reactive mixture is a reactive source of silicon. Illustrative of the reactive sources of silicon are colloidal silica, fumed silica, silicic acid, silicon alkoxide and mixtures thereof. Specific examples of silicon alkoxides include tetraethylorthosilicate and tetramethylorthosilicate. Finally, it is necessary that the reaction mixture contain a fluoride source, illustrative examples of which are: hydrogen fluoride, sodium fluoride, potassium fluoride, ammonium fluoride and ammonium bifluoride. The amount of fluoride is chosen, such that the Si:F ratio is greater than 0.4 to about 6 and preferably greater than 0.8 to about 3.

Having formed the reaction mixture, it is reacted at reaction conditions for an effective time to provide the desired composition. The reaction conditions necessary to produce the desired beidellite clay include a pH of about 4 to about 9 and preferably a pH of about 4 to about 7. The presence of the fluoride allows the $SiO_2$ to be mineralized. In addition to the necessary pH, it is also necessary to carry out the reaction at a temperature of at least 150° C. or greater, preferably in the range of about 150° C. to about 300° C. and especially in the range of about 150° to about 200° C. Finally the reaction mixture is reacted under the above described reaction conditions at an effective time which ranges from about 1 to about 20 days in order to produce the desired beidellite smectite clay.

The beidellite clay composition of this invention can be used as is or it can be pillared to catalyze various hydrocarbon processes. It is preferred to catalyze the various hydrocarbon process with a pillared beidellite clay. The clay can be pillared using methods well known in the art. Examples of pillars which are well known in the art are alumina, rare earth containing alumina, $ZrO_2$, $TiO_2$, $Cr_2O_3$, $SiO_2$, Si/Al (silica/alumina) and mixtures thereof. As stated, these pillars are introduced by combining the clay with an oligomer or polymer of the desired cation or mixture of cations at reaction conditions. For example, alumina pillars may be introduced by using aluminum chlorohydrate. Aluminum chlorohydrate (also known as aluminum chlorohydroxide) is a polymeric metal complex having the empirical formula

$$Al_{2+n}(OH)_{2n}Cl_6$$

where n has a value of about 4 to 12. The preparation of this aluminum polymer is generally known to those skilled in the art. See, for example: Tsuitida and Kobayashi, J. Chem. Soc. Japan (Pure Chem. Sect.), 64, 1268 (1943). Inoue, Osugi and Kanaji, J. Chem. Soc. Japan (Ind. Chem. Sec.), 61, 407 (1958).

A rare earth ACH is an ACH as described above which is modified to include one or more rare earth elements such as cerium, lanthanum, neodymium, europium, etc (all U.S. Pat. No. 4,952,544 which is incorporated by reference). The ACH polymer is modified with the rare earth by adding a soluble rare earth salt, preferably a water soluble rare earth salt. Examples of rare earth salts are the nitrates, halides, sulfates and acetates. Preferred rare earth elements are cerium and lanthanum with cerium nitrate and lanthanum nitrate being the preferred salts. The rare earth is introduced into the polymer or oligomer structure by mixing the rare earth salt either in solution (water preferred) or as a solid with the ACH. The mixture is refluxed at a temperature of about 105° to about 145° C. for a time of about 24 to about 100 hours. The molar ratio of rare earth (expressed as oxide, e.g., $CeO_2$) to alumina ($Al_2O_3$) in the solution prior to refluxing is from about 1:52 to about 1:1.

Descriptions of oligomers or polymers of the other pillaring materials can be found in the following references: 1) Si/Al—U.S. Pat. No. 4,176,090; 2) zirconia—Clays and Clay Minerals, 27, 119 (1979) and U.S. Pat. No. 4,176,090; 3) titania—U.S. Pat. No. 4,176,090; 4) chromium oxide—U.S. Pat. No. 4,216,188 and 5) silicon oxide—U.S. Pat. No. 4,367,163, all of which are incorporated by reference.

These pillared clays are prepared by means well known in the art such as adding the beidellite clay to a solution containing a pillar precursor, i.e., oligomer or polymer, stirring, filtering, redispersing with water (one or more times), isolating, drying and calcining at about 300° to about 800° for a time sufficient to fix the structure (preferably about 3 hours).

As stated, beidellite clay compositions are used to catalyze hydrocarbon conversion processes such as alkylation, cracking, hydrocracking, ester formation, dimerization, oligomerization, etc. It is particularly preferred to use the clay compositions of this invention whether pillared or non-pillared to catalyze alkylation and hydrocracking processes. The conditions necessary to carry out alkylation of aromatic compounds are well known and are disclosed, for example, in U.S. Pat. Nos. 3,965,043 and 3,979,331 which are incorporated by reference. Generally the process can be carried out in a batch type or a continuous type operation. In a batch type process, the catalyst, aromatic compound and alkylating agent are placed in an autoclave and the pressure increased, if necessary, in order to effect the reaction in the liquid phase. An excess amount of aromatic compound should be present, preferably in a range of about 2:1 to about 20:1 moles of aromatic compound per mole of alkylating agent. The reaction is carried out at an elevated temperature since the rate of alkylation is undesirably low at room temperature. Preferably the temperature is in the range of about 40° to about 200° C. The process is carried out for a time of about 0.5 to about 4 hours, after which the product is separated from the starting materials by conventional means.

If it is desired to carry out the process in a continuous manner, the catalyst is placed in a reactor which is heated to the desired operating temperature and the pressure increased above atmospheric, if necessary. The aromatic compound and alkylating agent are flowed over the catalyst bed at a predetermined liquid hourly space velocity sufficient to effect alkylation. The effluent is continuously withdrawn and conventional separation means used to isolate the desired product.

Hydrocracking conditions typically include a temperature in the range of 400° to 1200° F. (204°–649° C.), preferably between 600° and 950° F. (316°–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178–8,888 std. $m^3/m^3$), preferably between 2,000 and 30,000 scf per barrel of charge (355–5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the clay composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

The following examples are presented in illustration of this invention and are not intended as undue limitations on the generally broad scope of the invention as set out in the appended claims.

EXAMPLE 1

In a container, 0.77 g of NaF and 0.86 g HF were dissolved in 90 g of water. To this solution there were added 6 g of fumed silica (manufactured by Cabot Co. and identified as Cabosil ™). The resultant gel was stirred until homogeneous, followed by the addition of 4.4 g of AlOOH. This gel was then aged quiescently at room temperature for about 5 hours and then crystallized at 200° C. in a 125 cc Parr Reactor for 6 days. The product was collected by filtration, washed with about 2 L of deionized water and dried at 110° C. for 16 hrs. The x-ray diffraction characterization of the product showed it to be a dioctahedral smectite clay. This product also had a surface area of 55 $m^2/g$ as measured by the B.E.T. method. Chemical analysis gave the following results: Si=28.5 wt. %; Al=15.7 wt. %; F=0.8 wt. %; Na=2.1 wt. % and LOI=18 wt. %.

EXAMPLE 2

In a container 37.4 g of tetramethylammoniumchloride (TMACl) was dissolved in 430 g of water. To this solution there were added 15.8 g of AlOOH and 67.5 g of colloidal silica which has been ammonia stabilized (available from DuPont, Inc. and identified as Ludox T-M AS-40). After stirring for 10 minutes, a solution of $NH_4HF_2$ (12.8 g) in 52 g of water was added. The resultant gel was aged for 6 hours at room temperature and then crystallized at 200° C. in a Parr reactor (125 cc) for 6 days. The product was collected by filtration, washed with about 2 L of deionized water and dried at 110° C. for 16 hours. The x-ray diffraction characterization of the product showed it to be a dioctahedral smectite clay. This product also had a surface area of 65 $m^2/g$ as measured by the B.E.T. method.

EXAMPLE 3

In a container 1.1 g of NaF was dissolved in 195 g of water. To this solution there were added 15 g of fumed silica (manufactured by Cabot Co. and identified as Cabosil ™) which gave a gel that was stirred until homogeneous. To this gel there were added 1.1 g of NaOH in 10.8 g of water with stirring. Next, 11.9 g of AlOOH were added. The gel was aged quiescently at room temperature for about 5 hours and then crystallized at 200° C. in a Parr reactor for 5 days. The product was collected by filtration, washed with about 2 L of water, and dried at 110° C. for 16 hours. The x-ray diffraction characterization of the product showed it to be a dioctahedral smectite clay. This product also had a surface area of about 80 $m^2/g$ as measured by the B.E.T. method. Chemical analysis of this product gave the following results: Si=31.1 wt. %; Al=17.3 wt. %; F=1.4 wt. % and Na=1.9 wt. %.

EXAMPLE 4

A solution of 12 g of ACH solution (Reheis ™) in 1,000 g of water was prepared. To this solution there were added 10 g of the fluorided beidellite clay prepared in Example 1 which gave a slurry that was heated to 60° C. and aged at this temperature with stirring for 2 hrs. After cooling to room temperature, the clay was recovered by centrifugation, washed with water until substantially chloride free and then dried at 60° C. for 16 hours. X-ray diffraction analysis of the resultant product gave a $d_{(001)}$ of 18.3 Å indicating that the clay had been pillared. Additionally, the surface area of the material was analyzed to be 210 m²/g as determined by the B.E.T. method.

EXAMPLE 5

The cracking activity of pillared clay prepared in Example 4 was determined using the following heptene cracking test. The heptene cracking test uses an electrically heated rector which is loaded with 250 mg of 40-60 mesh (420-250 microns) particles of the catalyst to be tested. The catalyst was dried in situ for 30 minutes at 200° C. using flowing hydrogen, and then subjected to a reduction treatment of 565° C. in flowing hydrogen for one hour. The temperature of the reactor was then adjusted to 425° C. (inlet). The feed stream used to test the catalyst consists of hydrogen gas which is saturated with 1-heptene at 0° C. and atmospheric pressure. The feed stream was flowed over the catalyst at a flow rate of 250 cc/min. The effluent gas stream was analyzed using a gas chromatograph in order to calculate weight percent cracked product. Cracked product is product that has a lower molecular weight than the starting 1-heptene hydrocarbon.

The ACH pillared fluorided beidellite had a cracking activity of 58 weight percent.

I claim as my invention:

1. A beidellite layered clay composition having the empirical formula $$A_x(Al_4)(Si_{8-x}Al_x)(O_{20})(OH_{4-u}F_u)$$

where A is a cation, x is the moles of the cation and varies from about 0.1 to about 2.0, and u varies from about 0.1 to about 3.5.

2. The composition of claim 1 further characterized in that the clay layers are separated by pillars selected from the group consisting of alumina, rare earth containing alumina, $ZrO_2$, $TiO_2$, $Cr_2O_3$, $SiO_2$, silica/alumina and mixtures thereof.

3. The composition of claim 2 where the pillar is alumina.

4. The composition of claim 2 where the pillar is a rare earth containing alumina.

5. The composition of claim 1 further characterized in that A is selected from the group consisting of alkali metals, quaternary ammonium ions, quaternary phosphonium ions and mixtures thereof.

6. The composition of claim 5 where the quaternary ammonium ions are selected from the group consisting of tetramethylammonium ion, tetraethylammonium ion, tetrapropylammonium ion, tetrabutylammonium ion, tetra-t-butylammonium ion, tetrapentylammonium ion, tetraphenylammonium ion and mixtures thereof.

7. The composition of claim 1 where u varies from about 1.0 to about 3.0.

8. A process for preparing a beidellite layered clay composition having the empirical formula $$A_x(Al_4)(Si_{8-x}Al_x)(O_{20})(OH_{4-u}F_u)$$

where A is a cation, x is the moles of the cation and varies from about 0.1 to about 2.0, and u varies from about 0.1 to about 3.5, the process comprising providing a reaction mixture at a pH of 4 to 9, at an effective temperature and for an effective time to produce the composition, the reaction mixture comprised of reactive sources of aluminum and silicon, a cation salt, a fluoride source and water, the reaction mixture expressed in terms of molar ratios by the formula $$aR:ySiO_2:zAl_2O_3:wF^-:bH_2O$$

where R is at least one cation salt, a is the moles of R and is chosen such that the ratio of a:y varies from about 1 to about 20, y is the moles of $SiO_2$ and varies from about 6.6 to about 7.8, z is the moles of $Al_2O_3$ and varies from about 2.1 to about 2.7, w is the moles of fluoride and is chosen such that the ratio of Si:F is greater than 0.4 to about 6.0, and b is the moles of water and varies from about 40 to about 500.

9. The process of claim 8 where the temperature ranges from about 150° to about 300° C.

10. The process of claim 8 where the mixture is reacted for a time of about 1 to about 20 days.

11. The process of claim 8 where the cation salt, R, is selected from the group consisting of alkali metal compounds, quaternary ammonium compounds, quaternary phosphonium compounds and mixtures thereof, the quaternary compounds having the formula $R'_4M^+X^-$, where R' is an alkyl group containing from 1 to 8 carbon atoms or an aryl group, M is nitrogen or phosphorus and X is hydroxyl, carbonate or halide.

12. The process of claim 11 where the cation salt, R, is a quaternary ammonium compound selected from the group consisting of tetramethylammonium salts, tetraethylammonium salts, tetrapropylammonium salts, tetrabutylammonium salts, tetra-t-butylammonium salts, tetrapentylammonium salts, tetraphenylammonium salts and mixtures thereof.

13. The process of claim 8 where w varies from greater than 0.8 to about 3.0.

* * * * *